United States Patent [19]
Uesugi

[11] Patent Number: 5,946,350
[45] Date of Patent: Aug. 31, 1999

[54] DATA RECEIVING SYSTEM USING A DECISION FEEDBACK EQUALIZER

[75] Inventor: Mitsuru Uesugi, Yokohama, Japan

[73] Assignee: Matsushita Electric Industrial Co., Ltd., Osaka, Japan

[21] Appl. No.: 08/736,730

[22] Filed: Oct. 25, 1996

[30] Foreign Application Priority Data

Dec. 27, 1995 [JP] Japan .................................. 7-351245

[51] Int. Cl.$^6$ ........................... H03H 7/30; H03K 5/159
[52] U.S. Cl. ........................ 375/233; 375/231; 708/323
[58] Field of Search .................................. 375/233, 232, 375/231, 230, 229, 348, 346; 333/18; 364/724.2, 724.19; 708/322, 323

[56] References Cited

U.S. PATENT DOCUMENTS

| 5,155,742 | 10/1992 | Ariyavisitakul et al. | 375/233 |
|---|---|---|---|
| 5,222,101 | 6/1993 | Ariyavisitakul et al. | 375/231 |
| 5,274,670 | 12/1993 | Serizawa et al. | 375/233 |

FOREIGN PATENT DOCUMENTS

| 2130157 | 3/1995 | Canada . |
|---|---|---|
| 0656713 | 6/1995 | European Pat. Off. . |
| 8-149056 | 6/1996 | Japan . |

OTHER PUBLICATIONS

Yow–Jong Liu et al: "A Soft–Output Bidirectional Decision Feedback Equalization Technique for TDMA Cellular Radio", IEEE Journal on Selected Areas in Communications, vol. 11, No. 7, Sep. 1, 1993, pp. 1034–1045, XP000400013.

*Primary Examiner*—Don Vo
*Assistant Examiner*—Betsy L. Deppe
*Attorney, Agent, or Firm*—Pollock, Vande Sande & Amernick

[57] ABSTRACT

A data receiving system, for equalizing a reception signal by using a decision feedback equalizer when the reception signal is formatted to have a sync signal positioned at the center of a burst, comprises a receiving buffer for storing reception data, training calculation means for obtaining a tap coefficient by performing a training using the sync signal involved in the reception data, a direction selecting means for selecting a preferable direction for a tracking of the decision feedback equalizer, based on a judgement as to which direction is preferable for the decision feedback equalizer between the direction identical with the receiving sequence of the reception data and the direction opposed to the receiving sequence of the reception data, and a tracking calculation means for performing the calculation of the decision feedback equalizer by tracking the reception data along the preferable direction using the tap coefficient given from the training calculation means having executed the training along the preferable direction selected by the direction selecting means. With this arrangement, the decision feedback equalizer can be used in the minimum phase transition which is the most effective condition for the DFE, thereby enhancing the effect of compensating the distortion derived from the multipath fading.

16 Claims, 9 Drawing Sheets

FIG. 9
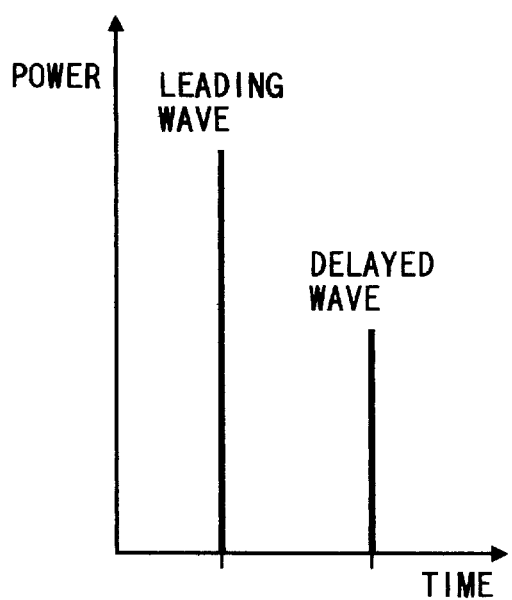
(a) MINIMUM PHASE TRANSITION
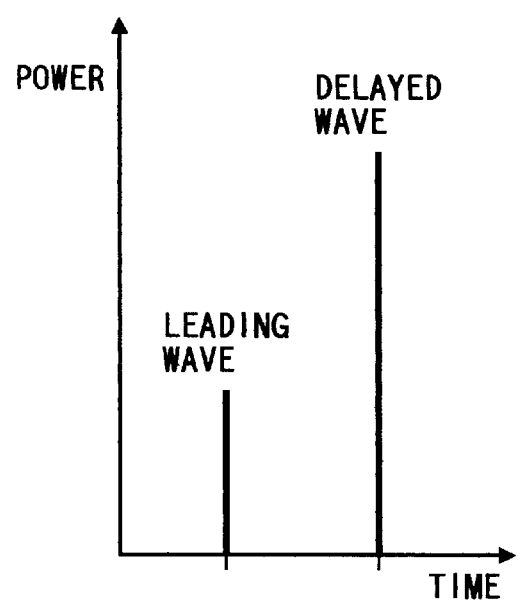
(b) NON-MINIMUM PHASE TRANSITION

DATA RECEIVING SYSTEM USING A DECISION FEEDBACK EQUALIZER

BACKGROUND OF THE INVENTION

1. Field of the Invention

The present invention relates to a data receiving system such as mobile communications using equalizers and the like, and more particular, to a data receiving system which improves the equalizing capability in the radio communication channel subjected to multipath fading and hence improves the reception quality.

2. Prior Art

In mobile communications, buildings or similar constructions are obstacles reflecting the radio waves and separating the propagating route of the radio waves into a plurality of different transmission paths connecting the transmitter side and the receiver side. It is accordingly usual that an early-arriving signal coming along a shorter transmission path and a late-arriving signal coming along a longer transmission path are mixed and inter-symbol interference is caused therebetween. In view of the above-described problem, digital mobile communication data receiving systems comprise adaptive automatic equalizers to compensate such inter-symbol interferences and enhance their reception quality. Among numerous equalizers, a decision feedback equalizers (DFE) is widely used because of its small computation amount. The decision feedback equalizer is an adaptive automatic equalizer which calculates an equalized output by using reception data entered after a designated time and the decision value of reception data entered before the designated time.

In several digital mobile communication systems such as PDC (personal digital cellular) and GSM (global system of mobile communications), a sync signal is positioned at the center of a burst and interposed between transmission data (refer to 21, 22 and 23 of FIG. 8). The data receiving system, receiving the transmission data of such a format, comprises two decision feedback equalizers independently performing the adaptive equalization processing of decision feedback type. One of two decision feedback equalizers performs the equalization for the data succeeding the sync signal, while the other decision feedback equalizer performs the equalization for the data preceding the sync signal.

This kind of conventional data receiving system, as shown in FIG. 7, comprises a receiving buffer 1 storing reception data, a forward training calculator 3 which calculates an initial value of the tap coefficient used in the equalization for the reception data succeeding the sync signal based on the training using the sync signal (known word) involved in the reception data, a backward training calculator 4 which calculates an initial value of the tap coefficient used in the equalization for the reception data preceding the sync signal based on the training using the sync signal, a forward tracking calculator 7 which performs the DFE equalization processing for the data succeeding the sync signal by using the tap coefficient (forward tap coefficient) 5 sent from forward training calculator 3, and a backward tracking calculator 8 which performs the DFE equalization processing for the data preceding the sync signal by using the tap coefficient (backward tap coefficient) 6 sent from backward training calculator 4.

According to this data receiving system, reception data II are stored in receiving buffer 1 and are occasionally used for the computation in each of calculators 3, 4, 7 and 8.

Forward training calculator 3, as shown in FIG. 8, performs the training of estimating the channel condition based on the difference between the known sync word and the actually received data, in the entire region of a predetermined forward training section 24 which is equivalent to the reception section of the sync signal. The forward tap coefficient 5, obtained through this training, is sent to forward tracking calculator 7.

Forward tracking calculator 7 performs the adaptive equalization processing of decision feedback type for the data II (23) received after sync signal 22, in the entire region of forward tracking section 25, by using an initial value equal to the forward tap coefficient 5. Then, forward tracking calculator 7 generates a demodulation output 9.

Meanwhile, backward training calculator 4 performs the training in the entire region of a predetermined backward training section 26 by retroactively following up the sync signal 22 along the direction opposed to the time sequence in the reception. The backward tap coefficient 6, obtained through this training, is sent to backward tracking calculator 8.

Backward tracking calculator 8 performs the adaptive equalization processing of decision feedback type for the data I (21) received before sync signal 22 along the direction opposed to the time sequence in the reception, in the entire region of a predetermined backward tracking section 27, by using an initial value equal to the backward tap coefficient 6. Then, backward tracking calculator 8 generates a demodulation output 10. The forward demodulation output 9 sent from forward tracking calculator 7 and the backward demodulation output 10 sent from backward tracking calculator 8 are taken out as a demodulation output 11 in a time division manner.

FIG. 9 shows the impulse response of the radio communication channel. Case (a) represents a so-called minimum phase transition where the power of a leading wave is larger than that of a delayed wave. Case (b) represents a so-called non-minimum phase transition where the power of the leading wave is smaller than that of the delayed wave. The DFE-type equalizer can compensate the distortion derived from the delayed wave in each of the minimum phase transition and the non-minimum phase transition. Accordingly, the above-described data receiving system can perform the equalization processing for both of data I (21) and data II (23), improving the reception quality.

However, the way of removing the inter-symbol interference in the above-described decision feedback equalizer is to cancel the delayed signal when signals are successively entered. For this reason, in the case of the minimum phase transition, the one not canceled and remaining is the signal having a larger power and the removed one is the signal having a smaller power. On the contrary, in the case of the non-minimum phase transition, the remaining one is the signal having the smaller power and the removed one is the signal having the larger power. The S/N ratio is hence deteriorated. Accordingly, the minimum phase transition is preferable to obtain a larger effect of the DFE, when it is compared with the non-minimum phase transition.

However, the above-described conventional receiving system performs the equalization processing for both of data I and data II of the reception data by inverting the time sequence in a reciprocative manner. For this reason, either the data I or data II must be the minimum phase transition and the other must be the non-minimum phase transition whenever the basic wave and the delayed wave are both present. Accordingly, the fact that the half of the reception data is always the non-minimum phase transition provokes the problem that the degree of improvement of the reception quality is substantially determined by the effect to the non-minimum phase transition.

SUMMARY OF THE INVENTION

Accordingly, in view of above-described problems encountered in the prior art, a principal object of the present invention is to provide a data receiving system capable of highly improving the reception quality by operating the decision feedback equalizer exclusively for the minimum phase transition, thereby realizing the effective equalization processing.

In order to accomplish this and other related objects, the data receiving system of the present invention provides a direction selecting means for identifying a preferable direction for the decision feedback equalizer between the direction identical with the receiving sequence in the reception data and the direction opposed to the same. Then, the adaptive equalization processing is performed in the region ranging all of the slots along the preferable direction selected by the direction selecting means.

With this arrangement, the effect of the decision feedback equalizer is enhanced and the reception quality is greatly improved.

More specifically, a first aspect of the present invention provides a data receiving system for equalizing a reception signal by using a decision feedback equalizer when the reception signal is formatted to have a sync signal positioned at the center of a burst, comprising: a receiving buffer for storing reception data; a training calculation means for obtaining a tap coefficient by performing training using the sync signal involved in the reception data; direction selecting means for selecting a preferable direction for a tracking of the decision feedback equalizer, based on a judgement as to which direction is preferable for the decision feedback equalizer between the direction identical with the receiving sequence of the reception data and the direction opposed to the receiving sequence of the reception data; and a tracking calculation means for performing the calculation of the decision feedback equalizer by tracking the reception data along the preferable direction using the tap coefficient given from the training calculation means having executed the training along the preferable direction selected by the direction selecting means. With this arrangement, the decision feedback equalizer can be used solely in the most effective conditions, improving the effect of compensating the distortion caused by the multipath fading.

According to a second aspect of the present invention, the training calculation means comprises a forward training calculation means for performing the training along the direction identical with the receiving sequence of the reception data with respect to the sync signal and a backward training calculation means for performing the training along the direction opposed to the receiving sequence of the reception data with respect to the sync signal. The tracking calculation means performs the calculation of the decision feedback equalizer by using the tap coefficient obtained from a designated one of the forward training calculation means and backward training calculation means, when the designated training calculation means has executed the training along the direction identical with the preferable direction selected by the direction selecting means. Hence, the tracking calculation means is always given the initial value for the tap coefficient preferable for the calculation of the decision feedback equalizer.

Furthermore, a third aspect of the present invention provides a data receiving system for equalizing a reception signal by using a decision feedback equalizer when the reception signal is formatted to have a sync signal positioned at the center of a burst. A receiving buffer stores reception data and a training calculation means obtains a tap coefficient by performing training using the sync signal involved in the reception data. A direction selecting means selects a preferable direction for tracking of the decision feedback equalizer, based on a judgement as to which direction is preferable for the decision feedback equalizer between the direction identical with the receiving sequence of the reception data and the direction opposed to the receiving sequence of the reception data. A leading tracking calculation means for performs the calculation of the decision feedback equalizer by tracking a half of the reception data along the preferable direction selected by the direction selecting means using the tap coefficient given from the training calculation means having executed the training along the preferable direction. A tap coefficient estimation means corrects the tap coefficient given to the leading tracking calculation means by estimating the variation or fluctuation of the radio communication channel. A trailing tracking calculation means performs the calculation of the decision feedback equalizer by tracking the remaining half of the reception data along the preferable direction selected by the direction selecting means based on the tap coefficient corrected by the tap coefficient estimation means. Accordingly, the receiving system can respond to the quick change of the channel conditions by correcting the tap coefficient in the calculation of the decision feedback equalizer for the remaining half of the reception data.

According to a fourth aspect of the present invention, the tap coefficient estimation means executes the correction based on the difference between the tap coefficient given to the leading tracking calculation means and the corrected tap coefficient obtained after finishing the calculation of the leading tracking calculation means. Hence, it becomes possible to obtain the corrected tap coefficient by interpolating the channel variations based on these tap coefficients.

According to a fifth aspect of the present invention, the training calculation means comprises a forward training calculation means for performing the training along the direction identical with the receiving sequence of the reception data with respect to the sync signal and a backward training calculation means for performing the training along the direction opposed to the receiving sequence of the reception data with respect to the sync signal. The leading tracking calculation means performs the calculation of the decision feedback equalizer by using the tap coefficient obtained from a designated one of the forward training calculation means and backward training calculation means, when the designated training calculation means has executed the training along the direction identical with the preferable direction selected by the direction selecting means. Hence, the leading tracking calculation means is always given the initial value for the tap coefficient preferable for the calculation of the decision feedback equalizer.

According to a sixth aspect of the present invention, the direction selecting means compares training error signals generated from the forward training calculation means and the backward training calculation means, and specifies a direction giving a smaller error signal as the direction preferable for the decision feedback equalizer. Hence, the tracking direction of the decision feedback equalizer can be selected by finding out the preferable direction for the training with respect to the sync signal to obtain a better result.

According to a seventh aspect of the present invention, there is provided a correlation calculating means for obtaining correlation between the reception signal and known data, wherein the direction selecting means selects the direction preferable for the decision feedback equalizer based on the correlation obtained by the correlation calculating means. Therefore, the direction of the minimum phase transition can be discriminated from the characteristics appearing on the correlation result.

According to an eighth aspect of the present invention, the training calculation means performs the training along the preferable direction selected by the direction selecting means. Therefore, the training calculation means performs the training exclusively along only one direction, resulting in the reduction of the computation amount.

According to a ninth aspect of the present invention, the direction selecting means compares delay spread obtained before and after the time the maximum impulse response is obtained, based on the resultant correlation, and selects the direction preferable for the decision feedback equalizer based on the comparison result thus obtained. When the delay spread obtained after the maximum impulse response is smaller, the direction opposed to the receiving sequence is selected. On the other hand, when the delay spread obtained before the maximum impulse response is smaller, the direction identical with the receiving sequence is selected.

According to a tenth aspect of the present invention, the direction selecting means compares sums of impulse response powers obtained before and after the time the maximum impulse response is obtained, based on the resultant correlation, and selects the direction preferable for the decision feedback equalizer based on the comparison result thus obtained. When the sum of impulse response powers obtained after the maximum impulse response is smaller, the direction opposed to the receiving sequence is selected. On the other hand, when the sum of impulse response powers obtained before the maximum impulse response is smaller, the direction identical with the receiving sequence is selected.

According to an eleventh aspect of the present invention, the direction selecting means compares the time difference with respect to the maximum impulse response between a component having power exceeding a predetermined threshold and appearing before the maximum impulse response and another component having power exceeding the predetermined threshold and appearing after the maximum impulse response, based on the resultant correlation, and selects the direction preferable for the decision feedback equalizer based on the comparison result thus obtained. When the time difference between the maximum impulse response and the component having power exceeding the threshold and appearing after the maximum impulse response is smaller, the direction opposed to the receiving sequence is selected. On the other hand, when the time difference between the maximum impulse response and the component having power exceeding the threshold and appearing before the maximum impulse response is smaller, the direction identical with the receiving sequence is selected.

BRIEF DESCRIPTION OF THE DRAWINGS

The above and other objects, features and advantages of the present invention will become more apparent from the following detailed description which is to be read in conjunction with the accompanying drawings, in which:

FIG. 9 is a view illustrating the minimum phase transition and the non-minimum phase transition.

DETAILED DESCRIPTION OF THE PREFERRED EMBODIMENTS

Figure 1:
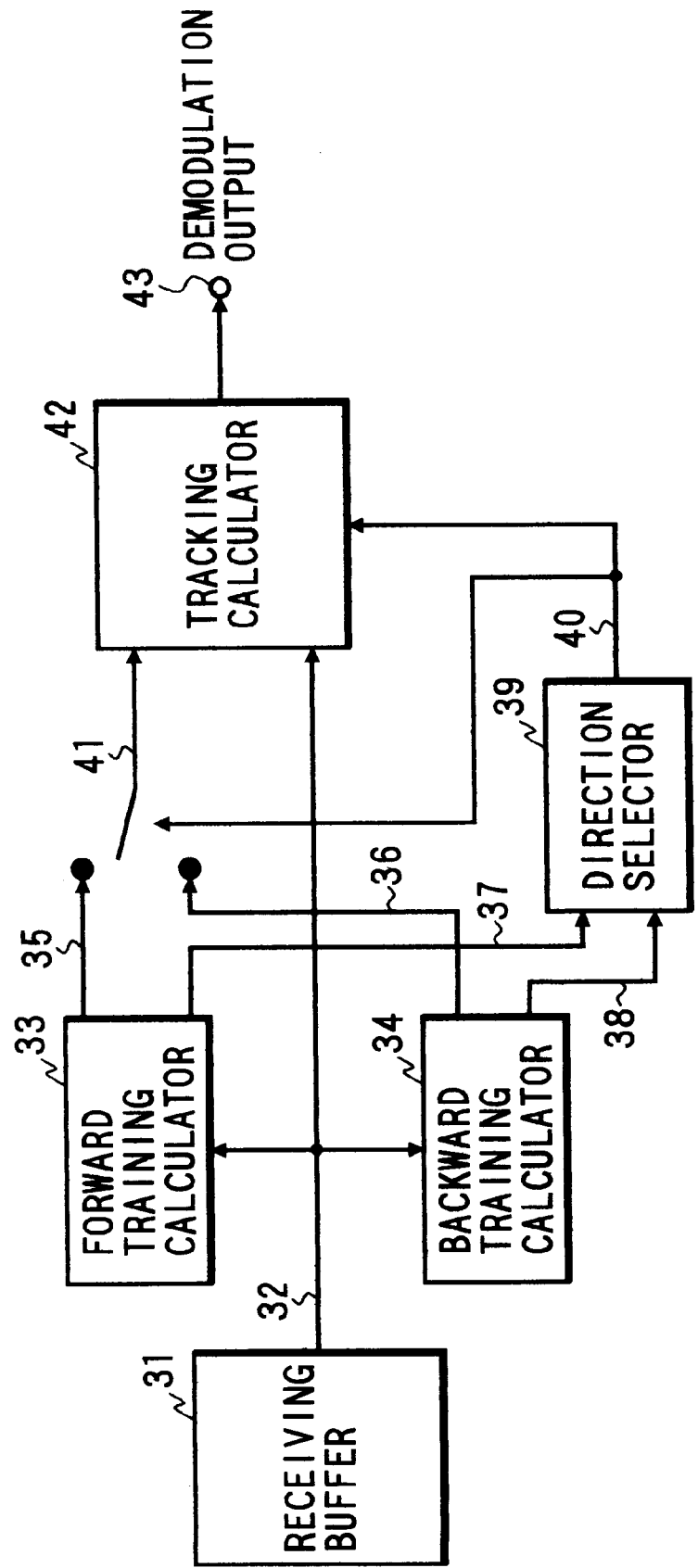
FIG. 1 is a schematic block diagram showing the arrangement of a data receiving system in accordance with a first embodiment of the present invention.

Preferred embodiments of the present invention will be explained in greater detail hereinafter with reference to the accompanying drawings. Identical parts are denoted by the same reference numerals throughout the views.

Hereinafter, the preferred embodiments of the present invention will be explained in greater detail with reference to the accompanying drawings.

Embodiment 1

The data receiving system in accordance with the first embodiment of the present invention, as shown in FIG. 1, comprises a receiving buffer 31 storing reception data, a forward training calculator 33 which calculates a forward tap coefficient by performing a training using the sync signal involved in the reception data along the direction identical with the time sequence in the reception, a backward training calculator 34 which calculates a backward tap coefficient by performing a training using the sync signal involved in the reception data along the direction opposed to the time sequence in the reception, a direction selector 39 which selects a preferable direction between the forward and backward directions, and a tracking calculator 42 which executes the calculation of the decision feedback equalizer by tracking the data I and data II of the reception data along the direction selected by the direction selector 39, using an initial value equal to a tap coefficient 41 generated from the training calculator 33 or 34 which have executed the training along the preferable direction selected by direction selector 39.

Figure 2:
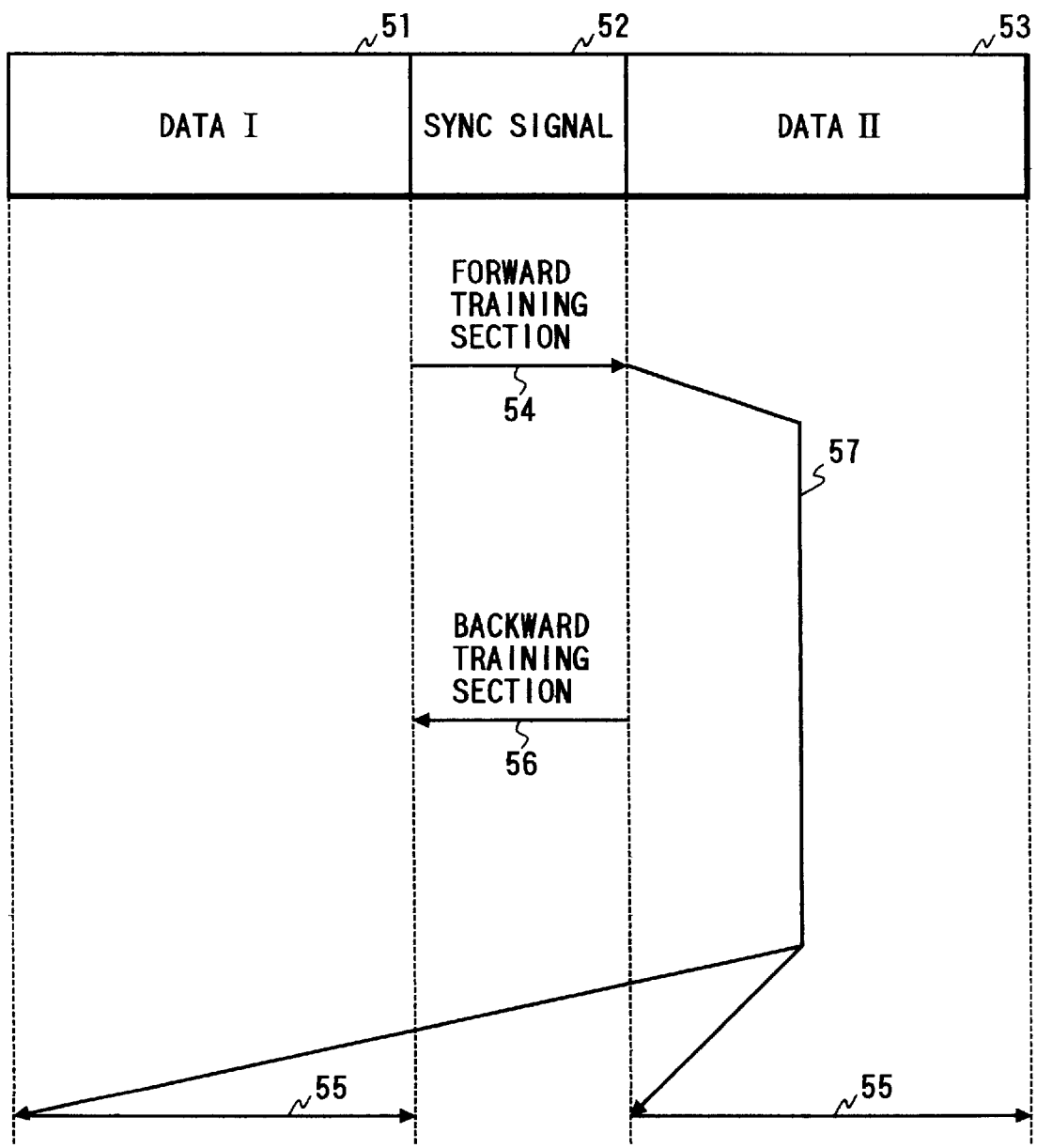
FIG. 2 is a view illustrating the operation of the data receiving system in accordance with the first embodiment of the present invention.

In this first embodiment, it is assumed that the reception data received by this receiving system is formatted as shown in FIG. 2. The reception data 32 are stored in receiving buffer 31, and are occasionally used for the calculation in the forward training calculator 33, backward training calculator 34 and tracking calculator 42.

Forward training calculator 33 performs the training by following up the sync signal 52 involved in the reception data along the direction identical with the time sequence in the reception, and then produces a forward tap coefficient 35 obtained through the training in the entire region of a predetermined forward training section 54. Furthermore, forward training calculator 33 produces a forward training error signal 37 representing an error generated through the training in this forward training section 54, and sends the resultant forward training error signal 37 to direction selector 39.

Meanwhile, backward training calculator 34 performs the training by following up the sync signal 52 involved in the reception data along the direction opposed to the time sequence in the reception, and then produces a backward tap coefficient 36 obtained through the training in the entire region of a predetermined backward training section 56. Furthermore, backward training calculator 34 produces a backward training error signal 38 representing an error generated through the training in this backward training section 56, and sends the resultant backward training error signal 38 to direction selector 39.

In this case, there is the possibility that either one of the forward side and backward side is the non-minimum phase transition. To judge it, direction selector 39 compares the forward training error signal 37 and the backward training error signal 38 to select a direction giving a smaller error, and then sends tracking calculator 42 a direction select signal 40 representing the selected direction.

Tracking calculator 42 performs the adaptive equalization processing by tracking the data I (51) and data II (53) along the direction designated by the direction select signal 40, using the initial value equal to the forward tap coefficient 35 or the backward tap coefficient 36 selected by the direction select signal 40. Then, tracking calculator 42 produces a demodulation output 43.

FIG. 2 shows the case where the forward training error signal 37 generated in the forward training section 54 is smaller than the backward training error signal 38 generated in the backward training section 56. In this case, direction selector 39 selects the forward side based on the direction select signal 40. As a result, tracking calculator 42 performs the tracking operation for the data II (53) along the same direction as the prior art to execute the adaptive equalization processing using the initial value equal to a tap coefficient 57 obtained through the forward training. Furthermore, tracking calculator 42 performs the tracking operation for the data I (51) along the time direction opposed to the prior art to execute the adaptive equalization processing using the initial value equal to tap coefficient 57 obtained through the forward training, as shown by the tracking sections 55 in the drawing.

On the other hand, when the direction selector 39 selects the backward side, the direction of the tracking sections 55 is inverted, and the tap coefficient to be used is replaced by the tap coefficient obtained through the backward training.

In this manner, the data receiving system of the first embodiment selects the tracking direction to be always the minimum phase transition in the tracking operation for the reception data in the adaptive equalization processing. The minimum phase transition is preferable for obtaining a large compensation effect when the equalizer is the decision feedback equalizer, although the distortion caused by the delayed wave can be compensated more or less in each of the minimum phase transition and the non-minimum phase transition. Accordingly, by selecting the direction properly in the manner described above, it becomes possible to surely improve the reception quality compared with the prior art.

Embodiment 2

A data receiving system in accordance with the second embodiment of the present invention detects the correlation relating to the known word and determines the tracking direction in the equalization processing based on the resultant correlation.

Figure 3:
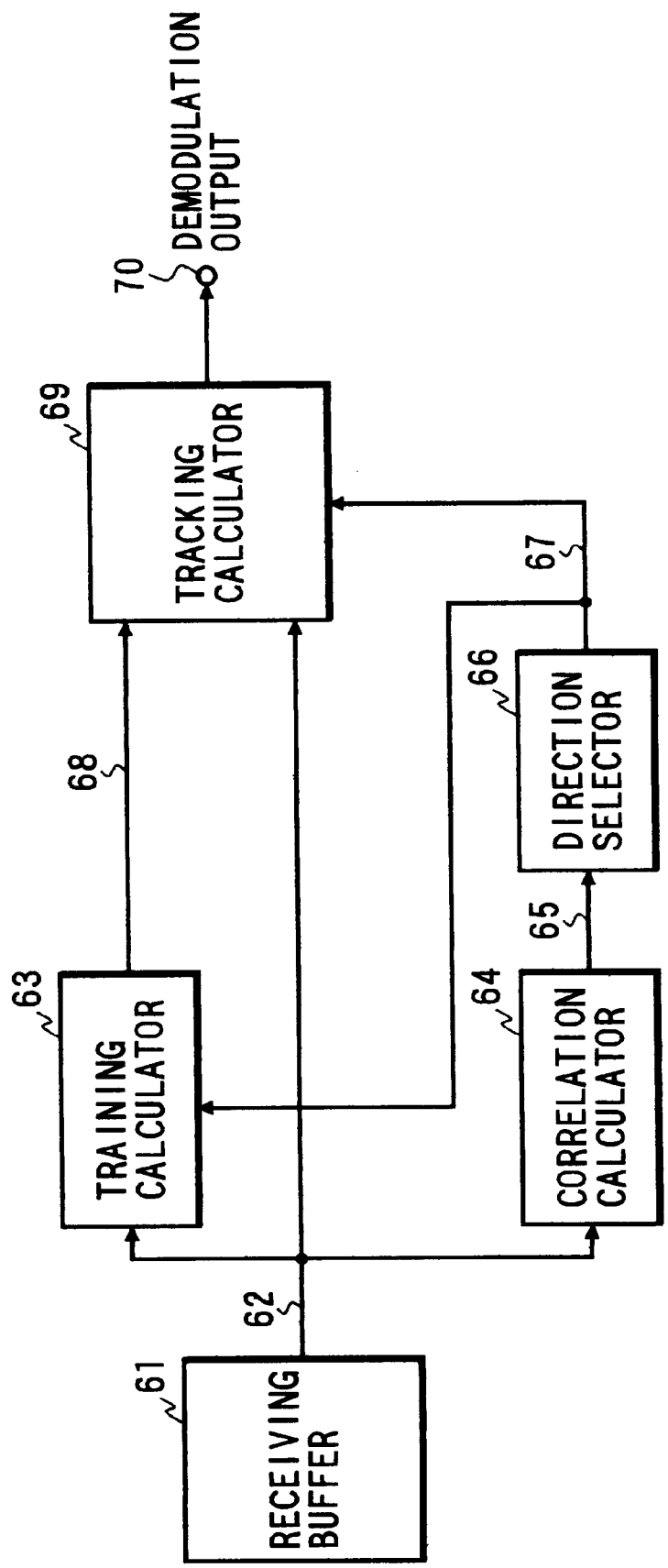
FIG. 3 is a schematic block diagram showing the arrangement of a data receiving system in accordance with a second embodiment of the present invention.

The data receiving system in accordance with the second embodiment, as shown in FIG. 3, comprises a receiving buffer 61 storing reception data, a correlation calculator 64 which calculates a correlation value between the known word, such as the sync signal, and reception data 62, a direction selector 66 which selects the training and tracking directions based on the correlation value calculated by the correlation calculator 64, a training calculator 63 which performs the training using the sync signal involved in the reception data along the direction selected by the direction selector 66 to calculate the tap coefficient, and a tracking calculator 69 which performs the calculation of the decision feedback equalizer by tracking the reception data along the direction selected by direction selector 66, using an initial value equal to a tap coefficient 41 obtained by training calculator 63.

The correlation calculator 64 in this second embodiment calculates the correlation between the known word, such as a memorized sync word, and the reception data and sends a correlation value 65 to direction selector 66. Direction selector 66 makes a judgement based on thus obtained correlation value as to whether the reception signal is closer to the minimum phase transition or to the non-minimum phase transition. When the reception signal is closer to the minimum phase transition, the direction identical with the time sequence in the reception is selected as a preferable direction for the training and tracking. When the reception signal is closer to the non-minimum phase transition, the direction opposed to the time sequence in the reception is selected as the preferable direction for the training and tracking.

The following is the details of the judgement done by the direction selector 66 to check whether the reception signal is closer to the minimum phase transition or to the non-minimum phase transition. The correlation value produced from correlation calculator 64, in the case of the minimum phase transition shown in (a) of FIG. 9, becomes maximum at the time the leading wave is received and then a smaller peak appears at the time the delayed wave is received. On the contrary, in the case of the non-minimum phase transition shown in (b) of FIG. 9, a smaller peak appears at the time the leading wave is received and thereafter the maximum value appears at the time the delayed wave is received. Hence, direction selector 66 compares the delay spread obtained after the maximum impulse response and the delay spread obtained before the maximum impulse response. When the delay spread obtained after the maximum impulse response is larger, it is judged that the reception signal is the minimum phase transition. On the contrary, when the delay spread obtained before the maximum impulse response is larger, it is judged that the reception signal is the non-minimum phase transition.

Alternatively, a sum of impulse response powers obtained after the maximum impulse response can be compared with a sum of impulse response powers obtained before the maximum impulse response. When the sum of impulse response powers obtained after the maximum impulse response is larger, it is judged that the reception signal is the minimum phase transition. On the contrary, when the sum of impulse response powers obtained before the maximum impulse response is larger, it is judged that the reception signal is the non-minimum phase transition.

Furthermore, it is possible to set a threshold having a predetermined value. And, among the power components exceeding this threshold, it is judged which is closer to the time of the maximum impulse response between the power component appearing after the maximum impulse response and the power component appearing before the maximum impulse response. When the power component appearing after the maximum impulse response is closer to the time of the maximum impulse response, it is judged that the reception signal is the minimum phase transition. On the contrary, when the power component appearing before the maximum impulse response is closer to the time of the maximum impulse response, it is judged that the reception signal is the non-minimum phase transition.

Direction selector 66 sends out a direction select signal 67 representing the direction thus selected to both the training calculator 63 and the tracking calculator 69.

Training calculator 63 performs the training along the direction designated by the direction select signal 67 with respect to the sync signal involved in the reception signal, and sends a tap coefficient 68 to tracking calculator 69. Tracking calculator 69 performs the adaptive equalization processing by tracking the data I (51) and data II (53) of the reception data along the direction designated by direction select signal 67, using an initial value equal to tap coefficient 68. Then, tracking calculator 69 produces a demodulation output 70.

When the direction selector 66 of this second embodiment selects the forward side, the processing order in the training calculator 63 and tracking calculator 69 becomes the same as that shown in FIG. 2. In this case, the calculation in the backward training section 56 can be omitted; accordingly, the computation amount can be reduced compared with the first embodiment.

In this manner, the data receiving system of the second embodiment executes the adaptive equalization processing by always selecting the direction corresponding to the minimum phase transition. Accordingly, compensation effect is largely obtained in the equalization processing, and it can be realized with a smaller computation amount.

Embodiment 3

A data receiving system in accordance with the third embodiment of the present invention newly obtains the tap coefficient used in the equalization processing applied to the second half of the reception data, thereby making it possible to quickly respond to sudden changes in the channel conditions.

Figure 4:
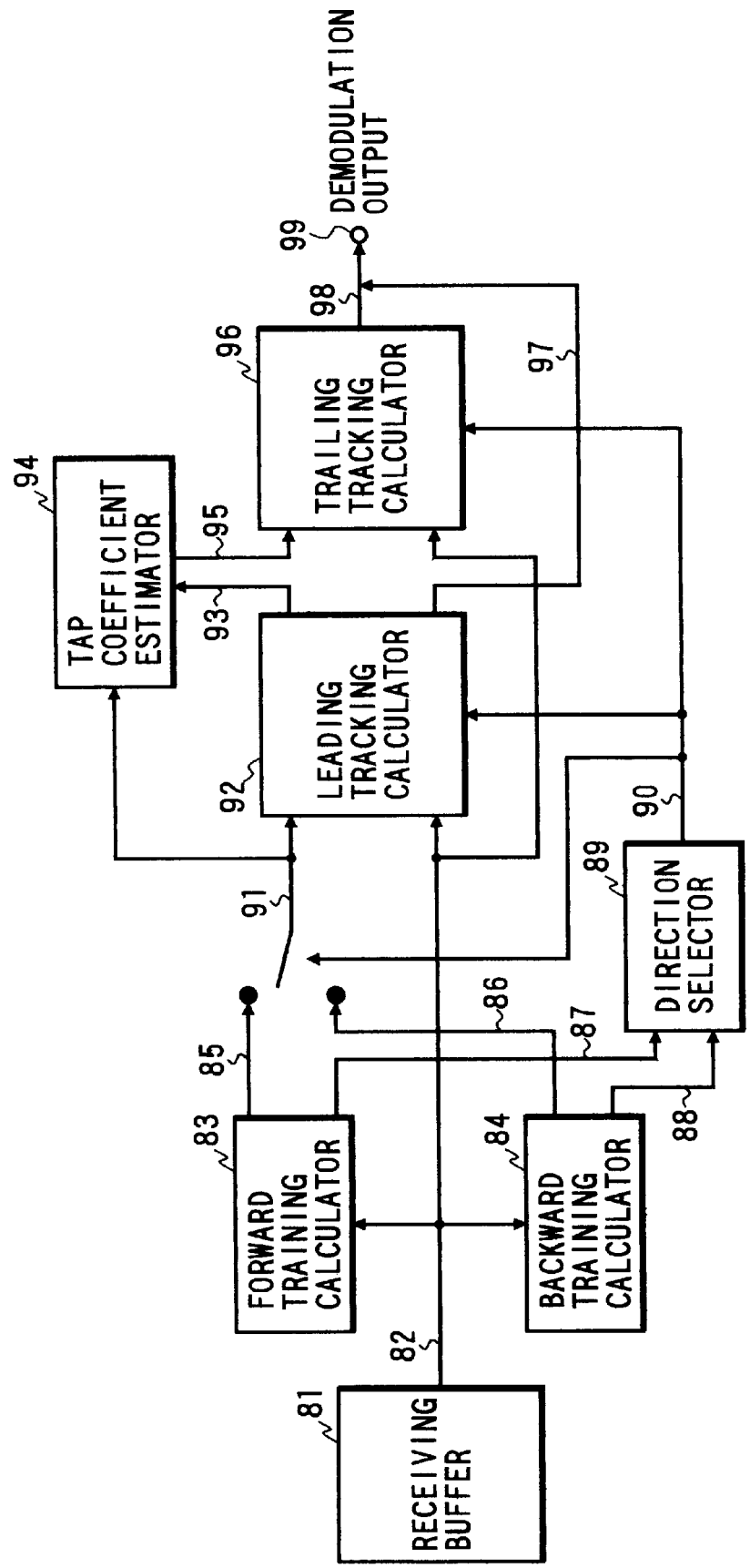
FIG. 4 is a schematic block diagram showing the arrangement of a data receiving system in accordance with a third embodiment of the present invention.

The data receiving system, as shown in FIG. 4, is different from the data receiving system of the first embodiment (FIG. 1) in that the tracking calculator 42 is replaced by a leading tracking calculator 92 which performs the DFE equalization processing for one of two reception data located before and after the sync signal by using the tap coefficient produced from the training calculator having executed the training along the direction selected by the direction selector 89, a tap coefficient estimator 94 which corrects the tap coefficient, and a trailing tracking calculator 96 which performs the equalization processing for the other of the two reception data located before and after the sync signal by using the tap coefficient calculated by the tap coefficient estimator 94.

The data receiving system of the third embodiment comprises a receiving buffer 81 storing reception data 82, a forward training calculator 83 generating a forward tap coefficient 85 and a forward training error signal 87, a backward training calculator 84 generating a backward tap coefficient 86 and a backward training error signal 88, and direction selector 89, which operate in the same manner as the corresponding components of the first embodiment. The training calculator 83 or 84 generates a tap coefficient 91 when it has executed the training along the direction selected by the direction select signal 90 produced from direction selector 89. This tap coefficient 91 is sent to both the leading tracking calculator 92 and the tap coefficient estimator 94.

Leading tracking calculator 92 performs the tracking operation for the reception data along the direction designated by direction select signal 90 by using an initial value equal to tap coefficient 91, thereby completing the calculation of the decision feedback equalizer for the first half of the reception data (i.e. data II when the direction designated by direction select signal 90 is the forward side, or data I when the direction designated by direction select signal 90 is the backward side). Then, leading track calculator 92 produces a demodulation output 97.

Figure 5:
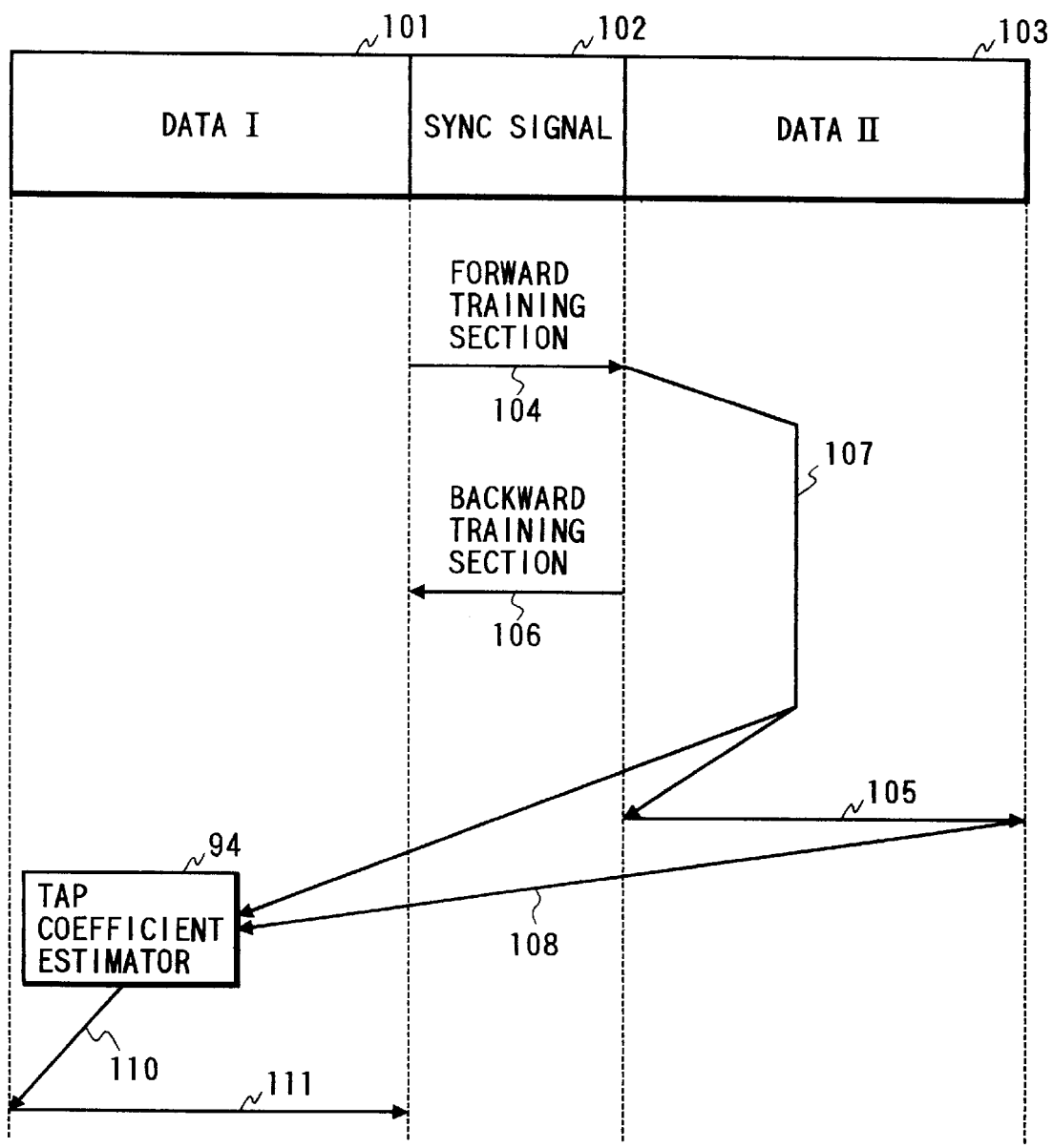
FIG. 5 is a view illustrating the operation of the data receiving system in accordance with the third embodiment of the present invention.

FIG. 5 shows an operation of the data receiving system of the third embodiment when the direction selector 89 selects the forward side. According to the suggestion of direction select signal 90, leading tracking calculator 92 performs the adaptive equalization processing by tracking the data II (103) along the direction identical with the time sequence in the reception (i.e. in a tracking section 105), using tap coefficient 107 obtained through the training in a predetermined forward training section 104. Then, leading tracking calculator 92 produces a demodulation output 97. Furthermore, leading tracking calculator 92 sends a tap coefficient 108 (93 in FIG. 4) to tap coefficient estimator 94 at the time the tracking operation is finished.

Tap coefficient estimator 94 obtains a new tap coefficient to be used in the adaptive equalization processing for the data I by using both the tap coefficient 107 (91 in FIG. 4) obtained at the time the forward training operation is finished and the tap coefficient 108 obtained at the time the leading tracking operation is finished. Such a renewal of the tap coefficient is effective when the channel conditions vary suddenly or fluctuate widely. Because, under such unstable conditions, the channel conditions near sync signal 102 are possibly differentiated from the channel conditions at the head of the burst. If the tap coefficient 107 obtained through the forward training is directly used as an initial value in the adaptive equalization processing for the data I, there will be the possibility that an error will be enlarged. The arrangement of the third embodiment effectively avoids this kind of problem.

Tap coefficient estimator 94 obtains a new tap coefficient 110 (i.e. an estimated tap coefficient 95 in FIG. 4) by the method of interpolating the channel variation or fluctuation based on the tap coefficient 107 obtained through the forward training operation and the tap coefficient 93 obtained through the leading tracking operation. Then, tap coefficient estimator 94 sends the new tap coefficient 110 to trailing tracking calculator 96.

According to the direction select signal 90, trailing tracking calculator 96 performs the calculation of the decision feedback equalizer by tracking the data I (101) along the direction identical with the time sequence in the reception (i.e. in a tracking section 111), using an initial value equal to the new tap coefficient 110. Then, trailing tracking calculator 96 generates a demodulation output 98.

As explained above, the demodulation output 97 of leading tracking calculator 92 and the demodulation output 98 of trailing tracking calculator 96 are generated as a time division demodulation output 99.

When direction selector 8.9 selects the backward side, leading tracking calculator 92 performs the adaptive equalization processing by tracking the data I (101) along the direction opposed to the time sequence in the reception, using the tap coefficient 86 obtained through the training in the backward training section 106. Then, leading tracking calculator 92 produces the demodulation output 97 and also sends the tap coefficient 93 to tap coefficient estimator 94 after finishing the tracking operation. Tap coefficient estimator 94 obtains the new tap coefficient 95 based on the tap coefficient 93 and the tap coefficient 86 obtained through the training, and sends the new tap coefficient thus obtained to trailing tracking calculator 96. Trailing tracking calculator 96 performs the adaptive equalization processing by tracking the data II (103) along the direction opposed to the time sequence in the reception, using an initial value equal to the new tap coefficient 95. Then, trailing tracking calculator 96 produces the demodulation output 98.

As explained above, the data receiving system of the third embodiment renews the initial value of the tap coefficient in the calculation for the trailing tracking calculator. Accordingly, even if the channel conditions are varied suddenly and fluctuated widely, it becomes possible to further improve the reception quality during the trailing tracking operation compared with the data receiving system of the first embodiment. Hence, the data receiving system can adequately respond to the variation and fluctuation of the channel conditions.

Embodiment 4

A data receiving system in accordance with the fourth embodiment is substantially the combination of the second and third embodiments. Hence, this system not only selects the tracking direction in the equalization processing based on the correlation result relating to the known data but adequately responds or follows to the sudden changes in the channel conditions.

Figure 6:
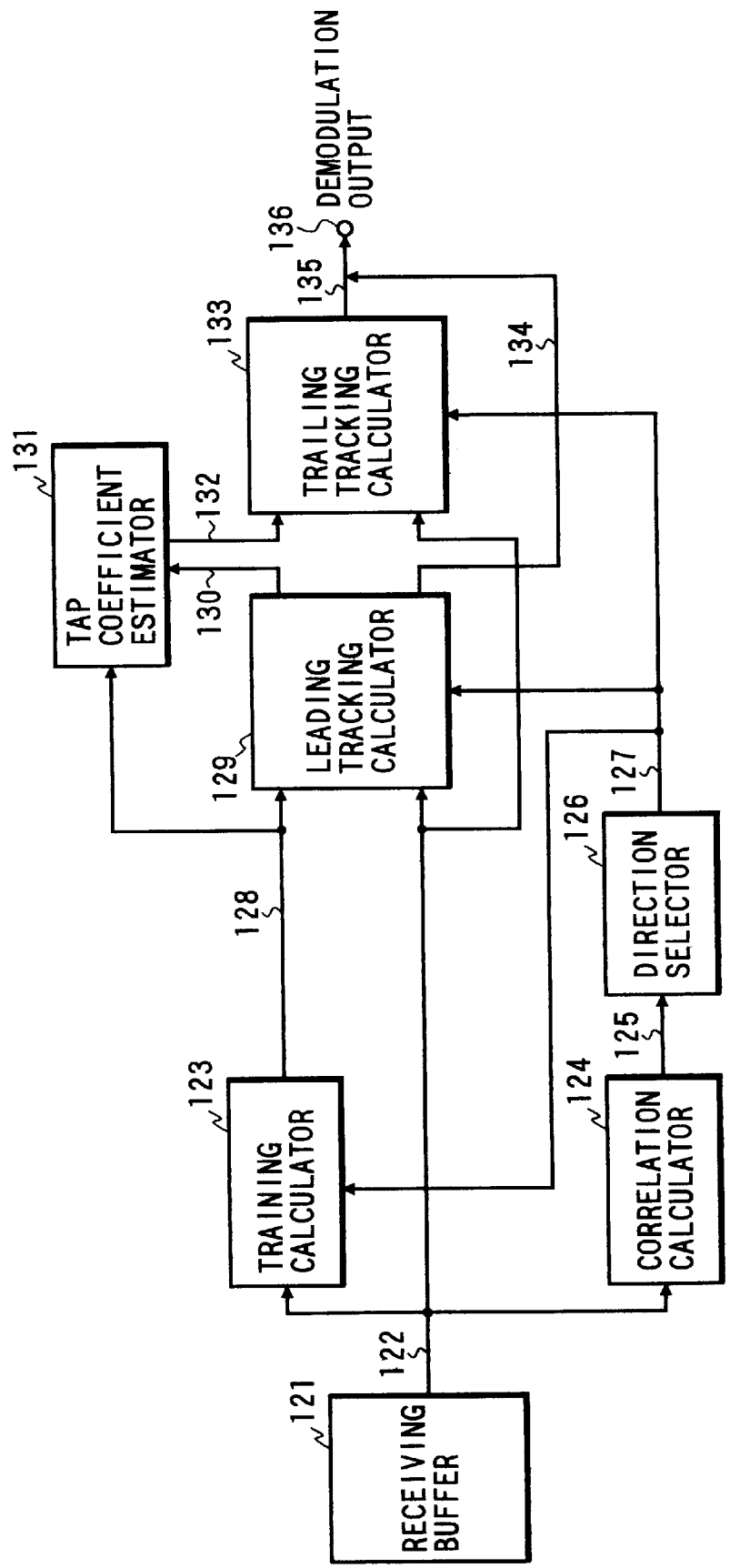
FIG. 6 is a schematic block diagram showing the arrangement of a data receiving system in accordance with a fourth embodiment of the present invention.
Figure 7:
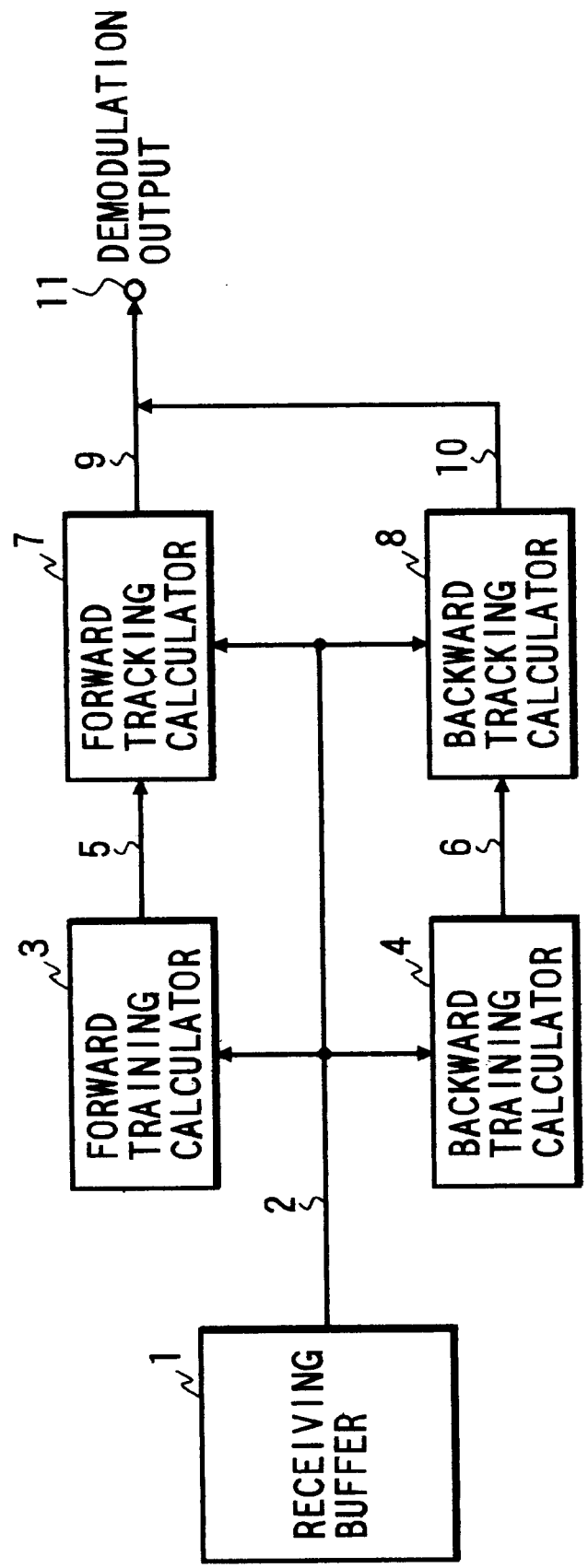
FIG. 7 is a schematic block diagram showing the arrangement of a conventional data receiving system.
Figure 8:
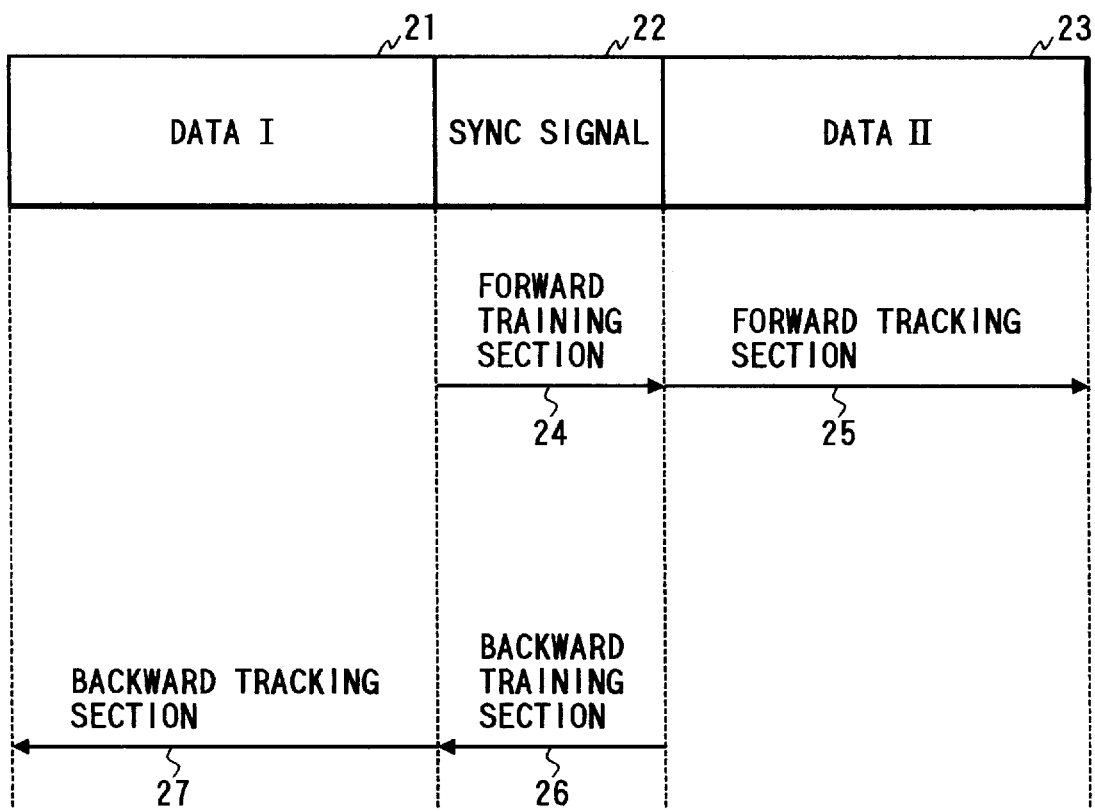
FIG. 8 is a view illustrating the operation of the conventional data receiving apparatus.

This system, as shown in FIG. 6, is different from the data receiving system of the second embodiment (FIG. 3) in that the tracking calculator 69 is replaced by a leading tracking calculator 129, a tap coefficient estimator 131 and a trailing tracking calculator 133. These leading tracking calculator 129, tap coefficient estimator 131 and trailing tracking calculator 133 operate in the same manner as the corresponding components 92, 94 and 96 of the third embodiment. Namely, leading tracking calculator 129 sends a tap coefficient 130 to tap coefficient estimator 131, and produces a demodulation output 134. Tap coefficient estimator 131 obtains a new tap coefficient 132 and sends it to trailing tracking calculator 133. Trailing tracking calculator 133 produces a demodulation output 135. Components 121, 123, 124 and 126 are identical with the above-described components 61, 63, 64 and 66 of the second embodiment. Furthermore, signals 122, 125, 127 and 128 are identical with the above-described signals 62, 65, 67 and 68 of the second embodiment.

The data receiving system of the fourth embodiment can further improve the reception quality during the trailing tracking operation compared with the data receiving system of the second embodiment, even when the channel conditions vary suddenly and fluctuate widely.

As apparent from the above-described explanation, the data receiving system in accordance with the present invention can enhance the effect of improving the reception quality, when the adaptive equalization processing using the decision feedback equalizer is applied to the reception data formatted to have the sync signal at an intermediate position of a burst.

Furthermore, when the tap coefficient estimator is provided in the data receiving system, the reception quality can be improved even under the suddenly varying and widely fluctuating channel conditions.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A data receiving system for equalizing a reception signal by using a decision feedback equalizer when said reception signal is formatted to have a sync signal positioned at the center of a burst, comprising:

a receiving buffer for storing reception data;

a training calculation means for obtaining a tap coefficient by performing training using the sync signal positioned at the center of a burst involved in said reception data;

a direction selecting means for selecting a preferable direction for a tracking of the decision feedback equalizer, based on a judgment as to which direction is preferable for the decision feedback equalizer between the direction identical with the receiving sequence of the reception data and the direction opposed to the receiving sequence of the reception data; and a tracking calculation means for performing the calculation of said decision feedback equalizer by tracking the reception data along said preferable direction using the tap coefficient given from the training calculation means further comprising a correlation calculating means for obtaining correlation between said reception signal and known data, wherein said direction selecting means selects the direction preferable for the decision feedback equalizer based on the correlation obtained by said correlation calculating means.

2. The data receiving system in accordance with claim 1, wherein said training calculation means performs the training along the preferable direction selected by said direction selecting means.

3. The data receiving system in accordance with claim 1, wherein said direction selecting means compares delay spreads obtained before and after the time a maximum impulse response is obtained, based on the resultant correlation, and selects the direction preferable for the decision feedback equalizer based on the comparison result thus obtained.

4. The data receiving system in accordance with claim 1, wherein said direction selecting means compares sums of impulse response powers obtained before and after a time the maximum impulse response is obtained, based on the resultant correlation, and selects the direction preferable for the decision feedback equalizer based on the comparison result thus obtained.

5. The data receiving system in accordance with claim 1, wherein said direction selecting means compares the time difference with respect to a maximum impulse response between a component having power exceeding a predetermined threshold and appearing before the maximum impulse response and another component having power exceeding the predetermined threshold and appearing after the maximum impulse response, based on the resultant correlation, and selects the direction preferable for the decision feedback equalizer based on the comparison result thus obtained.

6. A data receiving system for equalizing a reception signal by using a decision feedback equalizer when said reception signal is formatted to have a sync signal positioned at the center of a burst, comprising:

a receiving buffer for storing reception data;

a training calculation means for obtaining a tap coefficient by performing a training using the sync signal involved in said reception data;

a direction selecting means for selecting a preferable direction for a tracking of the decision feedback equalizer, based on a judgement as to which direction is preferable for the decision feedback equalizer between the direction identical with the receiving sequence of the reception data and the direction opposed to the receiving sequence of the reception data;

a leading tracking calculation means for performing the calculation of said decision feedback equalizer by tracking a half of said reception data along said preferable direction selected by said direction selecting means using the tap coefficient given from said training calculation means having executed the training along said preferable direction;

a tap coefficient estimation means for correcting said tap coefficient given to said leading tracking calculation means by estimating variation or fluctuation of radio communication channel; and a trailing tracking calculation means for performing the calculation of said decision feedback equalizer by tracking the remaining half of said reception data along said preferable direction selected by said direction selecting means based on the tap coefficient corrected by said tap coefficient estimation means.

7. The data receiving system in accordance with claim 6, wherein said tap coefficient estimation means executes the correction based on the difference between the tap coefficient given to said leading tracking calculation means and said corrected tap coefficient obtained after finishing the calculation of said leading tracking calculation means.

8. The data receiving system in accordance with claim 7, wherein said training calculation means comprises a forward training calculation means for performing the training along the direction identical with said receiving sequence of said reception data with respect to said sync signal and a backward training calculation means for performing the training along the direction opposed to said receiving sequence of said reception data with respect to said sync signal, and said leading tracking calculation means performs the calculation of said decision feedback equalizer by using the tap coefficient obtained from a designated one of said forward training calculation means and backward training calculation means, when said designated training calculation means has executed the training along the direction identical with said preferable direction selected by said direction selecting means.

9. The data receiving-system in accordance with claim 8, wherein said direction selecting means compares training error signals generated from said forward training calculation means and said backward training calculation means, and specifies a direction giving a smaller error signal as said direction preferable for the decision feedback equalizer.

10. The data receiving system in accordance with claim 6, wherein said training calculation means comprises a forward training calculation means for performing the training along the direction identical with said receiving sequence of said reception data with respect to said sync signal and a backward training calculation means for performing the training along the direction opposed to said receiving sequence of said reception data with respect to said sync signal, and said leading tracking calculation means performs the calculation of said decision feedback equalizer by using the tap coefficient obtained from a designated one of said forward training calculation means and backward training calculation means, when said designated training calculation means has executed the training along the direction identical with said preferable direction selected by said direction selecting means.

11. The data receiving system in accordance with claim 10, wherein said direction selecting means compares training error signals generated from said forward training calculation means and said backward training calculation means, and specifies a direction giving a smaller error signal as said direction preferable for the decision feedback equalizer.

12. The data receiving system in accordance with claim 6, further comprising a correlation calculating means for obtaining correlation between said reception signal and known date, wherein said direction selecting means selects the direction preferable for the decision feedback equalizer based on the correlation obtained by said correlation calculating means.

13. The data receiving system in accordance with claim 12, wherein said training calculation means performs the training along the preferable direction selected by said direction selecting means.

14. The data receiving system in accordance with claim 12, wherein said direction selecting means compares delay spreads obtained before and after a time the maximum impulse response is obtained, based on the resultant correlation, and selects the direction preferable for the decision feedback equalizer based on the comparison result thus obtained.

15. The data receiving system in accordance with claim 12, wherein said direction selecting means compares sums of impulse response powers obtained before and after a time the maximum impulse response is obtained, based on the resultant correlation, and selects the direction preferable for the decision feedback equalizer based on the comparison result thus obtained.

16. The data receiving system in accordance with claim 12, wherein said direction selecting means compares the time difference with respect to a maximum impulse response between a component having power exceeding a predetermined threshold and appearing before the maximum impulse response and another component having power exceeding the predetermined threshold and appearing after the maximum impulse response, based on the resultant correlation, and selects the direction preferable for the decision feedback equalizer based on the comparison result thus obtained.

* * * * *